(12) United States Patent
Deolalikar et al.

(10) Patent No.: US 10,331,799 B2
(45) Date of Patent: Jun. 25, 2019

(54) GENERATING A FEATURE SET

(71) Applicant: Hewlett-Packard Development Company, L.P., Houston, TX (US)

(72) Inventors: Vinay Deolalikar, Cupertino, CA (US); Hernan Laffitte, Mountain View, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 484 days.

(21) Appl. No.: 14/780,707

(22) PCT Filed: Mar. 28, 2013

(86) PCT No.: PCT/US2013/034400
§ 371 (c)(1),
(2) Date: Sep. 28, 2015

(87) PCT Pub. No.: WO2014/158169
PCT Pub. Date: Oct. 2, 2014

(65) Prior Publication Data
US 2016/0085811 A1    Mar. 24, 2016

(51) Int. Cl.
*G06F 17/30* (2006.01)

(52) U.S. Cl.
CPC .. *G06F 17/30522* (2013.01); *G06F 17/30539* (2013.01); *G06F 17/30598* (2013.01)

(58) Field of Classification Search
CPC ......... G06F 17/30864; G06F 17/30247; G06F 17/3071
USPC ......... 707/737, E17.014, E17.108, 706, 708, 707/723, 999.107, E17.023, E17.089, 707/E17.002, E17.009, 722, 748, 749, 707/752, 769, 999.003, E17.001, E17.005, 707/E17.017, E17.02, E17.024, E17.026, 707/E17.028, E17.046, E17.059, E17.071, 707/E17.086, E17.109, E17.112, 600, 707/709, 724, 728, 731, 732, 735, 736, 707/738, 740, 741, 742, 751; 726/23, 22, 726/24, 25; 709/224, 201, 203, 213, 217, 709/223, 226, 227, 228
See application file for complete search history.

(56) References Cited

U.S. PATENT DOCUMENTS 7,599,933 B2  10/2009  Domany et al.
8,316,024 B1  11/2012  Ben-Artzi et al.
(Continued)

FOREIGN PATENT DOCUMENTS

CN   101523412       9/2009
CN   102265598      11/2011
CN   102893277       1/2013
EP   1191459 A1     3/2002

OTHER PUBLICATIONS

Extended European Search Report dated Oct. 24, 2016; EP Application No. 13880634.4; pp. 7.
(Continued)

*Primary Examiner* — Jay A Morrison
*Assistant Examiner* — Ken Hoang

(57) ABSTRACT

A technique to generate a feature set. A plurality of samples from a data set can be clustered. Features can be selected based on the clusters. The features can be added to the feature set. Additional samples can be clustered and features selected and added to the feature set until a convergence threshold is reached.

19 Claims, 3 Drawing Sheets

(56) References Cited

U.S. PATENT DOCUMENTS

| | | | |
|---|---|---|---|
| 8,321,455 B2 | 11/2012 | Warner et al. | |
| 9,152,703 B1* | 10/2015 | Satish | G06F 17/30705 |
| 2002/0161758 A1* | 10/2002 | Wang | G06F 19/24 |
| 2003/0154181 A1 | 8/2003 | Liu et al. | |
| 2003/0204484 A1 | 10/2003 | Charpiot et al. | |
| 2004/0191804 A1 | 9/2004 | Alessi et al. | |
| 2007/0174268 A1 | 7/2007 | Posse et al. | |
| 2010/0076911 A1* | 3/2010 | Xu | G06F 17/30864 706/12 |
| 2010/0174670 A1* | 7/2010 | Malik | G06F 17/30705 706/12 |
| 2011/0047156 A1 | 2/2011 | Knight et al. | |
| 2013/0110839 A1* | 5/2013 | Kirshenbaum | G06F 17/30705 707/740 |

OTHER PUBLICATIONS

Jain A K et al: "Data clustering". ACM Computing Surveys, ACM. New York, NY, US, US, vol. 31, No. 3, Sep. 1, 1999 (Sep. 1, 1999), pp. 264-323, XP058090953, ISSN: 0360-0300, DOI: 10.1145/ 331499.331504 Sections 5.2.1, 6 1.2; figure 25.

Bertoni, A et al, "Feature Selection Combined with Random Subspace Ensemble for Gene Expression Based Diagnosis of Malignancies", 2005.

Liu, H et al, "Toward Integrating Feature Selection Algorithms for Classification and Clustering", Apr. 2005.

Petrik, M, "Optimization-based Approximate Dynamic Programming", Sep. 2010.

Song, Q et al, "A Fast Clustering-based Feature Subset Selection Algorithm for High-Dimentional Data" Jan. 2013.

* cited by examiner

GENERATING A FEATURE SET

BACKGROUND

In data mining, clustering can be used to group data objects based on similarities between the objects. Clustering can be useful because it can provide different perspectives on large sets of data. For example, in an enterprise setting, an enterprise may have a large corpus of documents. Clustering can be applied to the corpus to group the documents into multiple clusters. These clusters can reveal similarities between the clustered documents, enabling the enterprise to make more efficient use of its data and gain insights that may otherwise be difficult to draw.

BRIEF DESCRIPTION OF DRAWINGS

The following detailed description refers to the drawings, wherein.

DETAILED DESCRIPTION

Clustering a data set, such as a corpus of documents, can present various challenges. For example, a clustering operation may take a long time to execute if the corpus of documents is large. Typically, each document in the corpus may be represented by a feature vector. The clustering operation may cluster the documents based on the feature vectors. If the corpus is large, the total size of the feature vectors may also be large. However, due to limitations in the size of primary memory (e.g., RAM), a large set of feature vectors representing the document corpus may not all simultaneously fit into the primary memory of a computer system executing the clustering operation. As a result, the feature vectors may have to be read into primary memory from secondary memory (e.g., hard disk drive) during the clustering operation, which can cause the clustering operation to take longer to complete. According to techniques disclosed herein, a feature set may be generated for use in clustering a data set. The generated feature set may be smaller than the feature space of the data set, thus reducing the amount of memory used to perform the clustering operation.

In an example, a plurality of samples may be selected (e.g., randomly selected) from the data set and clustered using a clustering algorithm. A plurality of features may be selected based on the clustering. For instance, the features may be selected based on information gain with respect to cluster inclusion. The selected features may be added to the feature set. An additional plurality of samples may be selected from the data set and the above processing may be repeated to add additional features to the feature set. This may occur for various iterations until a convergence threshold is reached. For instance, the convergence threshold may relate to a size by which the feature set is growing, a size of the feature set, or a predetermined maximum number of iterations. The generated feature set may then be used to cluster the entire data set using the same clustering algorithm.

As a result, primary memory usage may be reduced due to the smaller number of features, enabling a clustering operation to be performed more efficiently over the entire data set. Furthermore, this smaller feature set may be obtained without first clustering the entire data set. In addition, because the feature set is generated using clusters generated by the same clustering algorithm, the feature set may be tailored specifically for that clustering algorithm, which may result in improved clustering. Additional examples, advantages, features, modifications and the like are described below with reference to the drawings.

Figure 1:
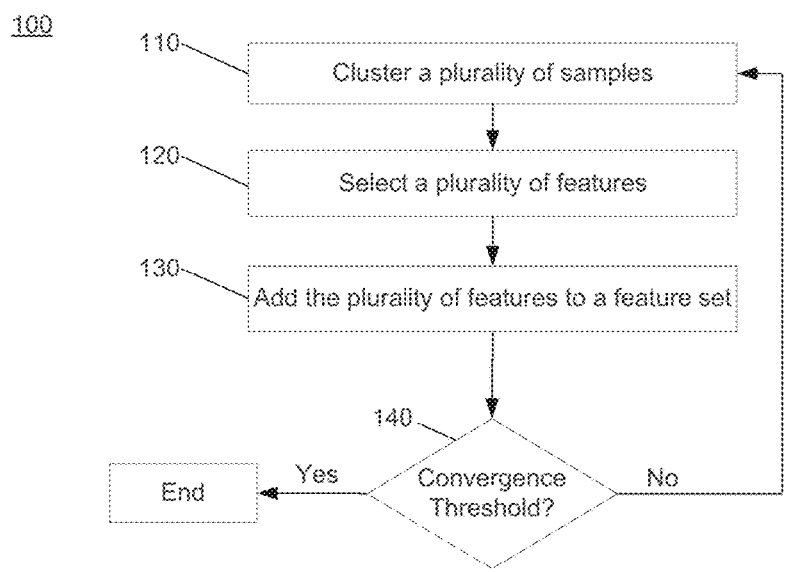
FIG. 1 illustrates a method of generating a feature set, according to an example.

FIG. 1 illustrates a method of generating a feature set, according to an example. Method 100 may be performed by a computing device, system, or computer, such as computing system 400 or computer 500. Computer-readable instructions for implementing method 100 may be stored on a computer readable storage medium. These instructions as stored on the medium are referred to herein as "modules" and may be executed by a computer.

Method 100 may begin at 110, where a plurality of samples from a data set may be clustered. The data set may include documents, images, or the like. For illustration purposes, an example will be described herein in which the data set comprises a corpus of documents. For instance, the corpus of documents may be a large corpus of documents stored in a database of an enterprise.

Each member of the data set may be represented by a feature vector. The vector space associated with the set of feature vectors representing all members of the data set is referred to herein as the "original feature space". Referring to the corpus of documents example, the feature vectors associated with the corpus may be expressed as a document-term matrix. Of course, other features of the documents may be included in the feature vectors as well, such as type of document, title, total number of words, etc.

As used herein, a "sample" is a member of the data set that has been sampled by a sampling technique. Accordingly, a plurality of samples of the document corpus would include a plurality of documents sampled using the sampling technique. Any of various sampling techniques may be used. In an example, independent, random sampling may be used to select a plurality of samples. While other sampling techniques may be used, such as user-directed sampling, independent, random sampling has the benefit of removing bias from the sampling process and potentially resulting in a more accurate representation of the distribution of the data set.

The number of samples included in the plurality of samples can be a parameter that is preset or specified by a user. The sampling size may be influenced by various factors. For example, a particular percentage (e.g., 1%, 5%) of the data set may be sampled using the sampling technique. Alternatively, a fixed number of samples may be sampled from the data set. For fast processing, the sampling size can be small enough that all of the feature vectors for the plurality of samples can fit into primary memory. Unexpected results were obtained with respect to sampling size during experimentation, as will be described later.

The plurality of sampled documents may be clustered using a clustering algorithm to yield a plurality of clusters. The number of clusters to be created can be a parameter that is preset or specified by a user. Any of various clustering algorithms may be used (e.g., hierarchical clustering, centroid-based clustering, distribution-based clustering, and density-based clustering). The same clustering algorithm that will be used to cluster the entire document corpus may be used to cluster the plurality of sampled documents. Using the same clustering algorithm to generate the feature set as will be used to ultimately cluster the entire data set may be beneficial because the generated feature set will then be tailored to the chosen clustering algorithm.

At 120, a plurality of features may be selected based on the plurality of clusters. For example, features in the original feature space may be evaluated based on the clustering generated in 110 to determine which features should be included in the feature set. The evaluation may be made based on various criteria. For instance, the features may be evaluated based on information gain with respect to cluster inclusion. This technique discerns what features are relevant to determining whether a document should be a member of a particular cluster. The features may be ranked based on the evaluation criteria and the top N features from each cluster may be selected for inclusion in the feature set. N may be a parameter that is preset or specified by a user.

At 130, the plurality of features may be added to the feature set. Redundant features (e.g., features that have already been added to the feature set) may be ignored such that selected features are added only if they are not already present in the feature set.

At 140, it may be determined whether a convergence threshold has been reached. If the convergence threshold has been reached ("Yes" at 140), method 100 may be terminated. If the convergence threshold has not been reached ("No" at 140), method 100 may continue to 110 to cluster another plurality of samples in order to add more features to the feature set. Method 100 may iterated through 110-140 multiple times until the convergence threshold is satisfied.

The convergence threshold may be any of various thresholds. The purpose of the convergence threshold is to indicate when method 100 should end, or alternatively, when the feature set has reached a satisfactory point for use. For example, the convergence threshold may be a point at which the feature set being generated exhibits a "falling profile". A falling profile as used herein indicates that the percentage by which the feature set grows after addition of the plurality of features according to, e.g., 130, falls below a certain value, such as 2%. Other percentages may be used. In another example, the convergence threshold may be a particular number. For example, the convergence threshold may be met if the number of features added to the feature set during an iteration is less than the particular number. Alternatively, the convergence threshold may be met if the number of iterations of method 100 is greater than the particular number. In some examples, the convergence threshold may be a user tunable parameter.

Figure 2:
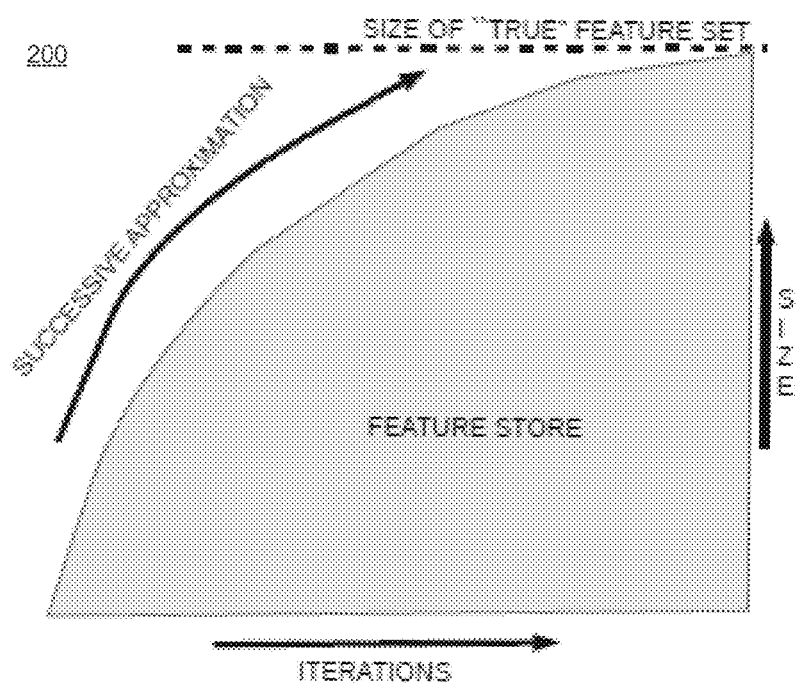
FIG. 2 depicts a graph illustrating how a feature set can be approximated using the disclosed techniques, according to an example.

Briefly turning to FIG. 2, graph 200 illustrates a falling profile for a feature set (referred to in the drawing as "FEATURE STORE"). A "true" feature set is posited, which is an ideal feature set for the data set. Method 100 (and other methods and variations herein) can be used to successively approximate this true feature set. As illustrated by the graph 200, as the number of iterations of the method increases, the size of the feature set increases and approaches the true feature set. The growth of the feature set, however, is not linear. Rather, the feature set grows quickly at the start of the method but slows as the number of iterations increases. This is due, for example, to the fact that redundant selected features are not added to the feature set. This trend in the growth of the feature set is what is intended by the term "falling profile".

Returning to FIG. 1, method 100 can thus be used to quickly generate a feature set that approximates an ideal feature set for a data set. The feature space of this feature set is smaller than the original feature space of the data set, thus enabling more of the feature vectors of the data set to fit into primary memory for faster clustering of the entire data set. Indeed, the parameters noted above can be modified to ensure that a generated feature set for the data set will be sufficiently small so that all of the feature vectors of the data set may fit into primary memory of the computer system being used.

The disclosed techniques can be more effective for generation of the feature set than simply taking a single random sampling of the data set. One reason is because a single random sampling likely will miss certain groupings of members of the data set. As a result, the generated feature set may not include features relevant to these groupings. Additionally, the disclosed techniques do not require processing of the entire data set for generation of the feature set. This enables the disclosed techniques to be incorporated into data analysis tools that will be deployed in environments where the data sets are previously unknown or are constantly changing. A further benefit is that the number of features in the feature set can be automatically selected by the disclosed techniques. This saves the user from having to guess what the ideal number of features would be for a given data set, which is a complex task involving various constraints, tradeoffs, and the like, not suitable for a user.

During experimentation, the inventors obtained some unexpected results. The inventors determined that a lower sampling size can enable method 100 to reach the convergence threshold more quickly. For example, on average, a sampling size of 1% resulted in quicker convergence than a sampling size of 25%. This has the added benefit that the lower the sampling size, the more likely the feature vectors of the sampled documents will fit into primary memory. Additionally, the inventors determined that the quality of the clustering produced by method 100 when the sampling size is 5% was often better than when the sampling size was higher. In short, the inventors determined that aggregating features selected from multiple samples can improve the quality of the generated feature set and simultaneously reduce the processing time and memory space needed.

The inventors also determined that it can be better to select more features during each iteration. For example, by setting N=20 rather than N=10, the inventors determined that the feature set may be bigger at the time of convergence and the quality of the clustering of the data set using the feature set may be improved.

Figure 3:
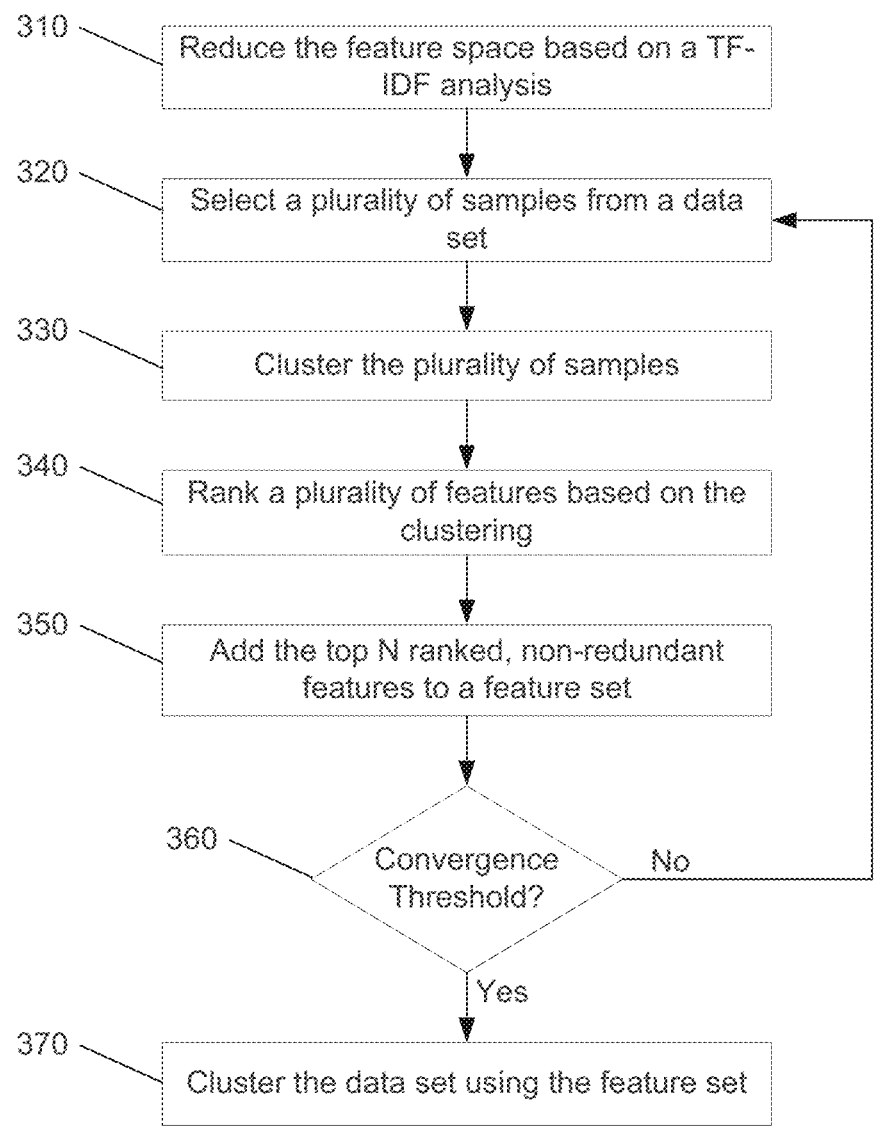
FIG. 3 illustrates a method of generating a feature set for clustering a data set, according to an example.

FIG. 3 illustrates a method 300 for generating a feature set for clustering, according to an example. Method 300 shows variations that may be used to modify method 100. At the same time, the description of method 100 applies to method 300. Method 300 may be performed by a computing device, system, or computer, such as computing system 500 or computer 600. Computer-readable instructions for implementing method 300 may be stored on a computer readable storage medium. These instructions as stored on the medium are referred to herein as "modules" and may be executed by a computer.

Method 300 may begin at 310, where the feature space may be reduced based on a term frequency-inverse document frequency (TF-IDF) analysis. The feature space reduced by the TF-IDF analysis may be the original feature space associated with the data set and its feature vectors. The new feature space may be referred to as a reduced feature space. TF-IDF analysis is a statistical technique that can be used to reduce the dimensionality of a feature space. By applying a TF-IDF analysis to the original feature space, features that are likely to be unhelpful for clustering purposes can be removed from the feature space so as to reduce the size of the feature vectors processed by the rest of method 300. Accordingly, the data set may be clustered based on the reduced feature space, and features selected therefrom.

At 320, a plurality of samples may be selected from the data set. At 330, the plurality of samples may be clustered. At 340, a plurality of features may be ranked based on the clustering. At 350, the top N ranked, non-redundant features may be added to the feature set. At 360, it may be determined whether a convergence threshold is met. If the convergence threshold is not met ("No" at 360), method 300 may continue to 320. If the convergence threshold is met ("Yes" at 360), method 300 may continue to 370, where the data set may be clustered using the feature set.

Figure 4:
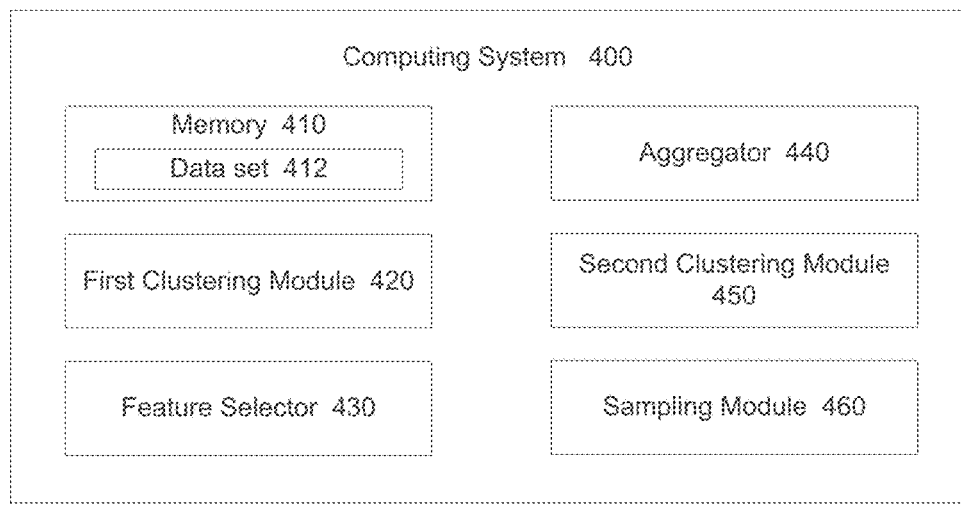
FIG. 4 illustrates a system for generating a feature set, according to an example.

FIG. 4 illustrates a system for generating a feature set, according to an example. Computing system 400 may include and/or be implemented by one or more computers. For example, the computers may be server computers, workstation computers, desktop computers, or the like. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, computing system 400 may include one or more machine-readable storage media separate from the one or more controllers, such as memory 410.

Computing system 400 may include memory 410, first clustering module 420, feature selector 430, and aggregator 440, second clustering module 450, and sampling module 460. Each of these components may be implemented by a single computer or multiple computers. The components may include software, one or more machine-readable media for storing the software, and one or more processors for executing the software. Software may be a computer program comprising machine-executable instructions.

In addition, users of computing system 400 may interact with computing system 400 through one or more other computers, which may or may not be considered part of computing system 400. As an example, a user may interact with system 400 via a computer application residing on system 400 or on another computer, such as a desktop computer, workstation computer, tablet computer, or the like. The computer application can include a user interface.

Computer system 400 may perform methods 100, 300, and variations thereof, and components 420-460 may be configured to perform various portions of methods 100, 300, and variations thereof. Additionally, the functionality implemented by components 420-460 may be part of a larger software platform, system, application, or the like. For example, these components may be part of a data analysis system.

In an example, memory 410 may be configured to store a data set 412. Sampling module 460 may be configured to generate independent, random samples of the data set for use by first clustering module 420. First clustering module 420 may be configured to cluster various pluralities of samples generated by sampling module 460 to generate a plurality of clusters for each plurality of samples. Feature selector 430 may be configured to select one or more features based on the plurality of clusters. Aggregator 440 may be configured to aggregate features selected based on multiple clusterings of multiple pluralities of samples from the data set until a convergence threshold is reached. Aggregator 440 may work in conjunction with first clustering module 420 and feature selector 430 to aggregate selected features over multiple iterations. Second clustering module 450 may be configured to cluster the entire data set based on the aggregated features. The first clustering module 420 and the second clustering module 450 may be configured to use the same clustering algorithm.

Figure 5:
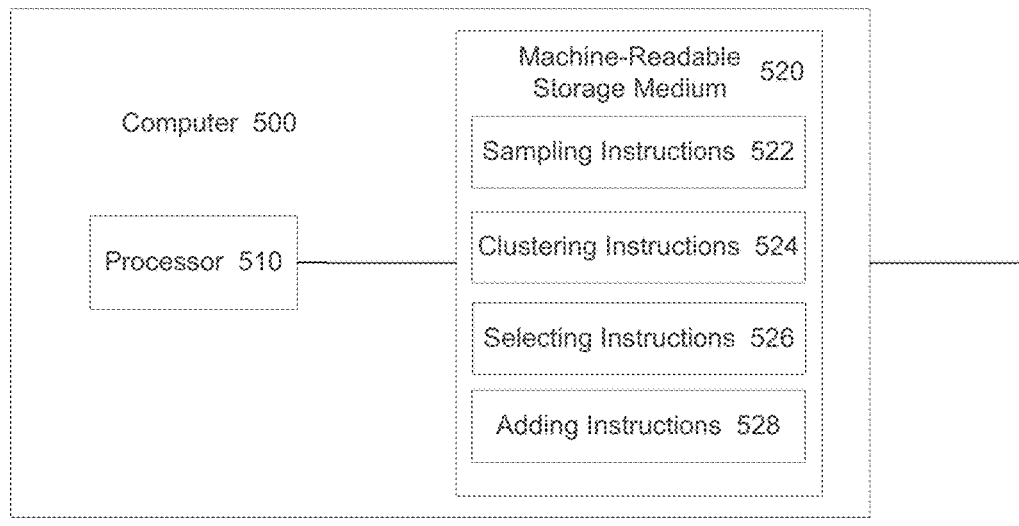
FIG. 5 illustrates a computer-readable medium for generating a feature set, according to an example.
Figure 5:
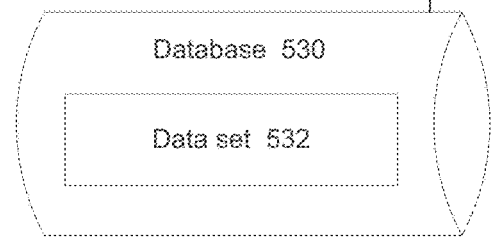

FIG. 5 illustrates a computer-readable medium for generating a feature set, according to an example. Computer 500 may be any of a variety of computing devices or systems, such as described with respect to computing system 500.

Computer 500 may have access to database 530. Database 530 may include one or more computers, and may include one or more controllers and machine-readable storage mediums, as described herein. Computer 500 may be connected to database 530 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 510 may be at least one central processing unit (CPU), at least one semiconductor-based microprocessor, other hardware devices or processing elements suitable to retrieve and execute instructions stored in machine-readable storage medium 520, or combinations thereof. Processor 510 can include single or multiple cores on a chip, multiple cores across multiple chips, multiple cores across multiple devices, or combinations thereof. Processor 510 may fetch, decode, and execute instructions 522-528 among others, to implement various processing. As an alternative or in addition to retrieving and executing instructions, processor 510 may include at least one integrated circuit (IC), other control logic, other electronic circuits, or combinations thereof that include a number of electronic components for performing the functionality of instructions 522-528. Accordingly, processor 510 may be implemented across multiple processing units and instructions 522-528 may be implemented by different processing units in different areas of computer 500.

Machine-readable storage medium 520 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 520 can be computer-readable and non-transitory. Machine-readable storage medium 520 may be encoded with a series of executable instructions for managing processing elements.

The instructions 522, 524 when executed by processor 510 (e.g., via one processing element or multiple processing elements of the processor) can cause processor 510 to perform processes, for example, methods 100, 300, and variations thereof. Furthermore, computer 500 may be similar to computing system 500 and may have similar functionality and be used in similar ways, as described above.

For example, sampling instructions 522 may cause processor 510 to select a plurality of samples from the data set 532 using a sampling technique. In an example, the sampling technique may be a random sampling algorithm. Clustering instructions 524 may cause processor 510 to cluster the plurality of samples into a plurality of clusters. Selecting instructions 526 may cause processor 510 to select a plurality of features based on the plurality of clusters. Adding instructions 528 may cause processor 510 to add the plurality of features to a feature set for clustering. Instructions 522-528 may be executed for multiple iterations until a convergence threshold is met. In an example, the convergence threshold may be met if the number of features added to the feature set for clustering in a given iteration is below a threshold. In an example, the feature set for clustering may be used to cluster the entire data set after the convergence threshold is met.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method executed by a system comprising a processor and a memory, comprising:
    generating a feature set having a smaller number of features than features of a feature space corresponding to feature vectors representing data objects of a data set, the generating comprising using a plurality of iterations of different samplings of samples from the data set, the plurality of iterations comprising:
        in a first iteration:
            clustering a first subset of samples from the data set into a first plurality of clusters using a clustering algorithm;
            selecting a first plurality of features based on the first plurality of clusters;
            adding the first plurality of features to the feature set;
        in each subsequent iteration following the first iteration:
            clustering an additional plurality of samples from the data set, the additional plurality of samples being in addition to samples sampled from the data set in a previous iteration of the plurality of iterations;
            selecting additional features based on resulting clusters from clustering the additional plurality of samples;
            adding the additional features to the feature set;
    continuing with the plurality of iterations until a convergence threshold is reached; and
    clustering the data set using the clustering algorithm and the feature set, the clustering of the data set using the clustering algorithm and the feature set using a number of feature vectors that are simultaneously fit into the memory, the number of feature vectors representing respective data objects of the data set.

2. The method of claim 1, further comprising:
    generating the feature space by performing a term frequency-inverse document frequency (TF-IDF) analysis of the data set to reduce a dimensionality relative to an original feature space associated with the data set.

3. The method of claim 1, wherein the convergence threshold is reached responsive to growth of the feature set in the plurality of iterations exhibiting a falling profile.

4. The method of claim 1, wherein the convergence threshold is reached responsive to the number of features added to the feature set during an iteration being less than a threshold.

5. The method of claim 1, wherein the convergence threshold is reached responsive to a number of plurality of iterations being greater than a threshold.

6. The method of claim 1, wherein the first subset of samples and the additional plurality of samples are independent, random samples from the data set.

7. The method of claim 1, wherein features are selected by:
    ranking features in each cluster by information gain with respect to cluster inclusion; and
    identifying top N ranked features from each cluster.

8. The method of claim 1, wherein features are added to the feature set only if they are not already present in the feature set.

9. The method of claim 1, wherein each feature vector including features of the feature set is smaller in size than a feature vector including features of the feature space.

10. The method of claim 1, wherein the feature set approximates an ideal feature set for the feature space.

11. A system, comprising:
    a processor;
    a memory; and
    a non-transitory storage medium storing instructions executable on the processor to:
        generate a feature set having a smaller number of features than features of a feature space corresponding to feature vectors representing data objects of a data set, the generating comprising using a plurality of iterations of different samplings of samples from the data set, and aggregating features selected based on multiple clusterings of multiple pluralities of samples from the data set in the plurality of iterations until a convergence threshold is reached, the plurality of iterations comprising:
            in a first iteration:
                cluster a first subset of samples from the data set into a first plurality of clusters using a clustering algorithm;

select a first plurality of features based on the first plurality of clusters;
add the first plurality of features to the feature set;
in each subsequent iteration following the first iteration:
cluster an additional plurality of samples from the data set, the additional plurality of samples being in addition to samples sampled from the data set in a previous iteration of the plurality of iterations;
select additional features based on resulting clusters from clustering the additional plurality of samples;
add the additional features to the feature set; and
cluster the data set using the clustering algorithm and the feature set, using a number of feature vectors that are simultaneously fit into the memory, the number of feature vectors representing respective data objects of the data set and comprising features of the feature set that are less in number than the features of the feature space.

12. The system of claim 11, wherein the first subset of samples and the additional plurality of samples are independent, random samples of the data set for use in generating the feature set.

13. The system of claim 11, wherein each feature vector including features of the feature set is smaller in size than a feature vector including features of the feature space.

14. The system of claim 11, wherein the feature set approximates an ideal feature set for the feature space.

15. A non-transitory computer readable storage medium storing instructions that when executed cause a system to:
generate a feature set having a smaller number of features than features of a feature space corresponding to feature vectors representing data objects of a data set, the generating comprising using a plurality of iterations of different samplings of samples from the data set, the plurality of iterations comprising:
in a first iteration:
cluster a first subset of samples from the data set into a first plurality of clusters using a clustering algorithm;
select a first plurality of features based on the first plurality of clusters:
add the first plurality of features to the feature set;
in each subsequent iteration following the first iteration:
cluster an additional plurality of samples from the data set, the additional plurality of samples being in addition to samples sampled from the data set in a previous iteration of the plurality of iterations;
select additional features based on resulting clusters from clustering the additional plurality of samples;
add the additional features to the feature set;
continue with the plurality of iterations until a convergence threshold is reached;
cluster the data set using the clustering algorithm and the feature set, using a number of feature vectors that are simultaneously fit into the memory, the number of feature vectors representing respective data objects of the data set and comprising features of the feature set that are less in number than the features of the feature space.

16. The non-transitory computer readable storage medium of claim 15, wherein the convergence threshold is reached responsive to a number of features added to the feature set for clustering in a given iteration being below a threshold.

17. The non-transitory computer readable storage medium of claim 15, wherein the different samplings comprise samplings using a random sampling algorithm.

18. The non-transitory computer readable storage medium of claim 15, wherein each feature vector including features of the feature set is smaller in size than a feature vector including features of the feature space.

19. The non-transitory computer readable storage medium of claim 15, wherein the feature set approximates an ideal feature set for the feature space.

* * * * *